United States Patent [19]
Portney et al.

[11] Patent Number: 5,303,023
[45] Date of Patent: Apr. 12, 1994

[54] APPARATUS AND METHOD FOR INSPECTING A TEST LENS, METHOD OF MAKING A TEST LENS

[75] Inventors: Valdemar Portney, Irvine, Calif.; Paul W. Bolton, Bozeman, Mont.

[73] Assignee: Allergan, Inc., Irvine, Calif.

[21] Appl. No.: 941,367

[22] Filed: Sep. 4, 1992

Related U.S. Application Data

[63] Continuation-in-part of Ser. No. 857,784, Mar. 26, 1992, abandoned.

[51] Int. Cl.$^5$ ............................................ G01M 11/00
[52] U.S. Cl. .................................................. 356/124.5
[58] Field of Search ............................ 356/124, 124.5

[56] References Cited

U.S. PATENT DOCUMENTS

| | | | |
|---|---|---|---|
| 3,743,427 | 7/1973 | Weiser | 356/124.5 |
| 3,930,732 | 1/1976 | Holly | 356/124.5 |
| 3,938,892 | 2/1976 | Klingman, III | 356/124.5 |
| 3,977,795 | 8/1976 | Buschmann | 356/124.5 |
| 4,241,996 | 12/1980 | Weiser | 356/124.5 |
| 4,324,459 | 4/1982 | Gerharz | 356/124.5 |
| 4,653,909 | 3/1987 | Kuperman | 356/124.5 |
| 4,854,669 | 8/1989 | Birnbach et al. | |

Primary Examiner—F. L. Evans
Attorney, Agent, or Firm—Gordon L. Peterson

[57] ABSTRACT

An apparatus for inspecting a test lens, such as an intraocular lens, comprising a light source and collimating lens positioned to receive light from the light source and direct collimated light to the test lens. A plurality of targets are positionable at the object focal plane of the collimating lens so that there is an image of the target at the image focal space of the test lens. The image of the target has generally radially extending and alternating first and second sectors with each of the first sectors being relatively light and each of the second sectors being relatively dark. Modulation transfer function is determined by determining the image contrast along a combination of selected ring-shaped regions of the image.

36 Claims, 7 Drawing Sheets

Microfiche Appendix Included
(128 Microfiche, 2 Pages)

Fig. 11

APPARATUS AND METHOD FOR INSPECTING A TEST LENS, METHOD OF MAKING A TEST LENS

CROSS REFERENCE TO RELATED APPLICATION

This application is a continuation-in-part of application Ser. No. 857,784 filed on Mar. 26, 1992, now abandoned.

REFERENCE TO MICROFICHE APPENDIX

This application includes a microfiche appendix which comprises 2 microfiche and 120 frames.

BACKGROUND OF THE INVENTION

This invention relates to a method and apparatus for inspecting a test lens, and more particularly to a method and apparatus f or determining an optical quality characteristic such as the modulation transfer function (MTF) of a test lens. Although the apparatus and method are usable for inspecting virtually any test lens, they are particularly adapted for the inspection of monofocal and multifocal intraocular lenses.

Virtually any lens has imperfections which cause an image formed by that lens to vary from the ideal. In order to assure that any imperfections in a test lens are within allowable tolerances, it is important to carefully inspect the lens. Lens inspection is particularly important f or lenses and lens systems where high performance is required. Intraocular lenses, which are adapted to be implanted in the human eye to replace the natural lens of the eye, are one important example of a high performance lens.

One important test for a lens is determining MTF of the lens. Generally MTF is a measure of the efficiency with which a lens or optical system is able to contrast regions of a target at various spatial frequencies. When the modulation transfer function drops to a predetermined level, it is presumed that the image can no longer be resolved, and the corresponding spatial frequency becomes the resolution limit of the system. MTF also provides a quantitative description of contrast and accounts for the effects of both diffraction and different types of aberrations on image quality. MTF is considered to be a more useful measure of lens performance than resolution alone.

MTF can be determined using either indirect or direct techniques. In the indirect method, images of a slit or pinhole are used and complex mathematics are employed to determine MTF. One such indirect system is shown by way of example in Klingman U.S. Pat. No. 3,938,892.

In direct MTF measurement systems, light is directed through a target to a test lens which forms an image of the target. For example, the target may he a grating, in which event the image is of the bars and spaces of the grating. Alternatively, the grating may be replaced with a target having sinusoidally varying light transmissive properties as disclosed, for example, in Kuperman U.S. Pat. No. 4,653,909. In any event, the image formed by the test lens has alternate light and dark regions which enable contrast to be measured at the different spatial frequencies defined by the widths of the light and dark regions of the image. Examples of direct MTF measurement systems are shown in Weiser U.S. Pat. No. 3,743,427 and Holly U.S. Pat. No. 3,930,732.

In order to obtain information on image contrast along different meridians of the test lens, it is known to rotate the target to move the regions of higher and lower spatial frequencies to different meridians. By taking contrast readings at different meridians, modulation transfer function can be calculated. One problem with this system is that the rotation of the target to provide different spatial frequencies along various meridians of the test lens introduces inaccuracies in the measurement needed to determine MTF. This is because these measurements are very sensitive to even very small changes in optical system location.

SUMMARY OF THE INVENTION

This invention overcomes these disadvantages. This invention utilizes a target which provides an image in which the spatial frequency of the image along a circumferentially extending region or band of the image generally coaxial with the image is substantially the same throughout such circumferentially extending region. Consequently, image contrast at the spatial frequency defined by the circumferentially extending region can be determined along various meridians without rotation of the target or the test lens.

With this invention, the spatial frequency of the image is a function of the radial dimension of the selected circumferentially extending region. Consequently, image contrast for selected spatial frequencies can be measured without moving of the target or the test lens.

This invention employs a target which provides a particular image which has generally radially extending and alternating first and second sectors. Each of the first sectors is relatively light and each of the second sectors is relatively dark. A target which will provide an image of this type is a sector target which has generally radially extending and alternating first and second sectors. Each of the first sectors is relatively light transmitting and each of the second sectors is less transmissive. A preferred example of a sector target of this type is known as a starburst target, and starburst targets are known per se.

Although the alternating sectors of the target may be in the form of a grating in which the light transmitting sectors are openings and the less transmissive sectors are opaque, preferably the target provides sinusoidal intensity modulation of light such that the darkness of the particular image provided by the target varies generally in sine wave fashion. An important feature of sinusoidal intensity modulation of light by the target is that the intensity of light at the image also varies sinusoidally even though the test lens has imperfections.

This invention may be embodied in an apparatus for inspecting a test lens which comprises a light source, a target positionable to receive light from the light source, and means for directing light from the target to the test lens with an image of the target being formed.

This invention provides means responsive to image contrast along a generally circumferentially extending region of the image of the sector target for determining an optical quality characteristic of the test lens. The optical quality characteristic of the test lens may be any one or more of many different characteristics. For example, the characteristic may be MTF, modulation, i.e. the ratio of contrast at the image to contrast at a corresponding region of the target, whether or not the test lens passes or fails a predetermined optical performance standard or other particular optical characteristic of the test lens.

The circumferentially extending region can be of various different configurations and may be of regular or irregular shape and may extend continuously or in interrupted fashion. However, the circumferentially extending region is shaped so that the spatial frequency of the image of the sector target along such circumferentially extending region is substantially the same. Preferably, the circumferentially extending region is generally ring-shaped and is continuous.

The generally circumferentially extending region, whether or not ring-shaped, can be obtained in a variety of ways. For example, the image of the target may be recorded, and the generally ring-shaped region of the image can be generated electronically or by software. Preferably, however, the ring-shaped region is provided by another target, such as a ring target, which is positionable to receive light from the light source and is usable for providing the generally ring-shaped region of the image. The ring target provides a circumferentially extending image. This image or a representative thereof, such as a centroid band or line of such image, can be superimposed on the image of the first target to establish the generally circumferentially extending or generally ring-shaped region of the first target. The ring target can be used to provide a continuous generally ring-shaped image or to provide an interrupted circumferentially extending image which can be completed electronically based upon assumptions as to the nature of the interrupted portions of the ring. Preferably, however, the ring-shaped image is continuous.

If the test lens were to be tested only in the best focus location, were of very high quality and were very accurately positioned, generation of the generally ring-shaped region of the image of the sector target could be generated electronically or by software with relatively minimal disadvantage. However, if any one or more of these factors is not present, generation of the generally ring-shaped region using a second target is very important in order to obtain good results. In actual practice, one or more of these factors is usually present.

For example, the test lens may have different focal lengths along different meridians, i.e. have cylindrical surfaces which create astigmatism. The multiple focal lengths provided by a test lens having this characteristic prevents it from having any one in focus location and prevents it from being of high quality. The same is true when the lens surface is warped or contains more complex surface characteristics which result in multiple focal lengths. Also, if the test lens is to be tested in any out of focus position, i.e. any focus other than the best focus, then the best focus requirement referred to above is not met.

In addition, if the test lens is tilted with respect to the optical axis or its center is displaced radially from the optical axis, then the center of the image created by the test lens is also decentered. This tends to create distortion of the image similar to astigmatic distortion and requires that the ring-shaped region be generated by a second target.

The absence of any of these three conditions creates distortion and/or certain unknowns in the image of the sector target. The use of the physical ring target automatically compensates for this in that the image of the ring target is distorted in the same manner as the image of the sector target so that the spatial frequency is automatically and accurately obtained.

One feature of this invention is determining the meridian, i.e. an image shift meridian, of any displacement of the image of the sector target off the optical axis and determining the optical quality characteristic using light intensity information for a meridian or meridians where the displacement has a lesser effect on image quality. This may be accomplished, for example, by not using the light intensity information for the light and dark sector pair at or nearest the image shift meridian and preferably by using the light intensity information for the light and dark sector pair at or nearest the meridian or meridians which are generally transverse to the image shift meridian. The test lens can then be randomly replaced in the holding apparatus and this process repeated. By doing this, the system of this invention is able to tolerate a test lens holding structure which is less than perfect in terms of lens tilting and/or lens decentration.

The invention also determines image contrast along a plurality of radially spaced, generally ring-shaped regions of the image of the sector target. Although each of these could be generated by a separate ring target, if desired, it has been found that the inspection procedure can be simplified and sufficiently good results can be obtained by scaling, electronically and/or with software additional ring-shaped regions from the ring-shaped region created by the ring target.

The ring-shaped region may of any configuration depending upon the optical characteristics and optical imperfections of the test lens. For a test lens which is of very high quality and which is very accurately positioned, the ring-shaped region can be approximated by a circle. However, if the test lens has astigmatic aberrations, a first order of approximation of the image distortion caused by such aberrations is an ellipse. Also, the radial dimension of the ring-shaped region must be sufficient so that it is resolvable particularly if the test lens is to be inspected in out of focus condition.

The means for determining the image contrast preferably includes means for processing the images of the targets to determine the MTF and/or other optical quality characteristics of the test lens. The processing means includes means for deriving first target information from the image of the sector target having the sectors and second target information from the image of the ring target and means for superimposing the first and second target informations so that image contrast along the generally ring-shaped region of the image of the sector target can be ascertained. The second target information preferably includes a centroid line or band of the image of the ring target, and the centroid band defines a generally circumferentially extending, and preferably ring-shaped region, of the image of the sector target. The centroid band is thinner radially than the image of the ring target, and therefore defines spatial frequency more precisely. The radially wider image of the ring target is desirable so it can be resolved in out of focus conditions. The processing means also includes means for determining another centroid band of a different radial dimension from the first centroid band so image contrast along another circumferentially extending, and preferably ring-shaped region, of the image of the sector target can be ascertained.

The apparatus for inspecting the test lens preferably includes a focal collimator optical system. This system has the advantage of maintaining the same angular relationship between the features of the target and the features of the image. As a result, the angular sizes of the first and second sectors referred to above is maintained between the sector target and its image and the corresponding spatial frequency is easily selected. The focal collimator system allows direct measurement of focal length, and consequently the transfer of spatial frequencies in angular terms to linear terms. This allows direct measurement of MTF as a function of spatial frequencies expressed in angular terms (cycles/degree).

Focal collimator systems are known and include a collimating lens positioned to receive light from the light source and direct collimated light to the test lens. The targets are positionable at the object focal plane of the collimating lens so an image of the target, which is positioned at the object focal plane of the collimating lens, is imaged by the test lens at the image focal space of the test lens.

This invention also provides a method of making a test lens of suitable optical quality. According to this feature of the invention, the test lens is provided utilizing any desired test lens manufacturing and/or assembly technique and then the test lens is inspected in accordance with one or more of the inspection features of this invention in order to determine an optical quality characteristic of the test lens. Then a determination is made as to whether or not the test lens is of suitable optical quality and such determination is made utilizing the optical quality characteristic of the test lens.

The invention, together with additional features and advantages thereof may best be understood by reference to the following description taken in connect with the accompanying illustrative drawings.

DESCRIPTION OF THE PREFERRED EMBODIMENT

Figure 1:
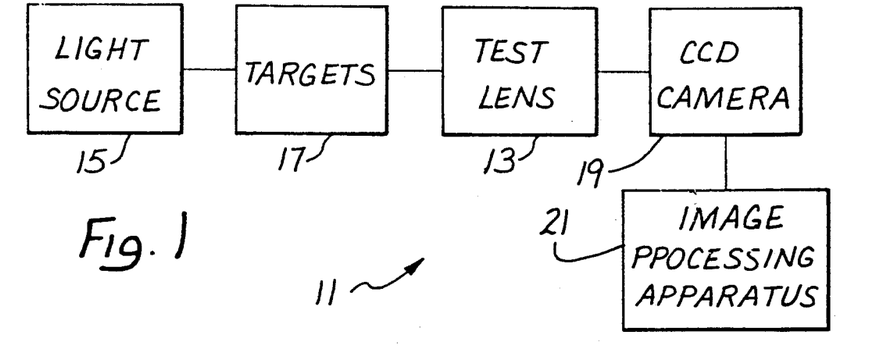
FIG. 1 is a schematic block diagram of an apparatus for inspecting a test lens.

FIG. 1 shows in schematic form an apparatus 11 for inspecting a test lens 13. As used herein "test lens" means one or more lenses or an optical system comprising one or more lenses. The test lens 13 is used to form an image, and therefore must be a converging lens or converging lens system or be a diverging lens or diverging lens system in which other optical elements are used to form the image. The apparatus 11 is particularly adapted for inspecting of monofocal and Taultifocal IOLS, although its use is by no means so limited.

In making a test lens 13 of suitable optical quality, the test lens is first provided utilizing any desired fabrication and/or assembly technique. The test lens 13 is then subjected to testing utilizing the apparatus 11 to determine an optical quality characteristic of the test lens. The apparatus 11 also determines whether the test lens 13 is of suitable optical quality using the optical quality characteristic determined for the test lens.

Generally, the apparatus 11 comprises a light source 15, targets 17, a CCD camera 19 and an image processing apparatus 21. With this arrangement, the light source 15 can direct light through a selected one of the targets 17 to the test lens 13. The test lens 13 forms an image of the target, and the image is recorded by the camera 19. One or more of the targets 17 can be used in sequence and the target images provide various information about the test lens 13. All of the images may be recorded by the camera 19. The image processing apparatus 21 processes the information obtained by the camera 19 as described more fully hereinbelow in order to determine MTF.

Figure 2A:
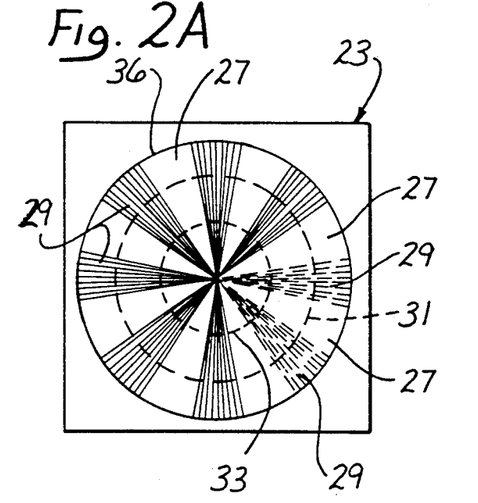
FIGS. 2A and 2B are elevational views showing one form of sector targets and one form of ring targets, respectively.
Figure 2B:
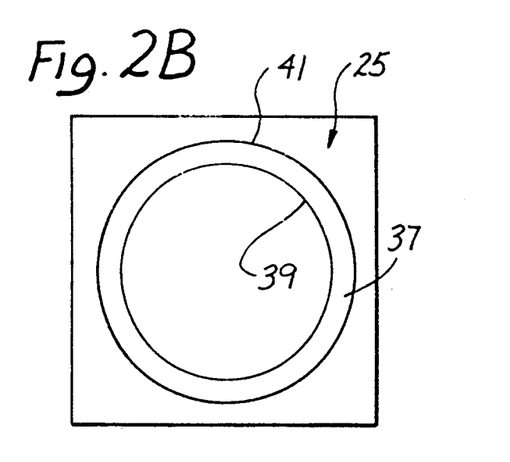

The targets 17 may comprise any desired number of targets, and in this embodiment, the targets 17 include a sector target in the form of a starburst target 23 (FIG. 2A) and a ring target in the form of a bullseye target 25 (FIG. 2B). The starburst target 23 has radially extending and alternating relatively light transmitting or transmissive sectors 27 and less light transmissive sectors 29. The sectors 27 transmit more of the light from the light source 15 than do the sectors 29. Although various different light-intensity modulation techniques can be used, in this embodiment, the intensity of the light transmitted by the target 23 from the light source 15 varies sinusoidally in a circumferential direction.

Figure 3:
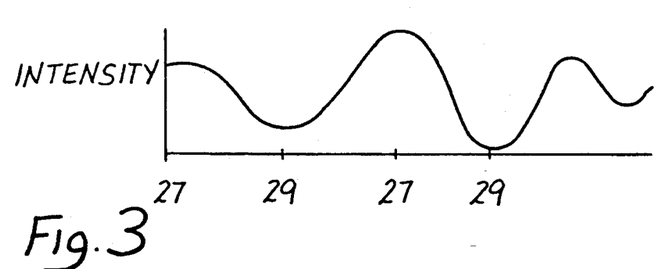
FIG. 3 is a plot showing the light intensity modulation achieved by the sector target of FIG. 2A.

FIG. 3 shows the intensity variation of light transmitted by the target 23 along any generally ring-shaped region having a center at the center of the target 23. From FIG. 3 it can be seen that the intensity variation is sinusoidal and that the minimum light transmitted is at the center of each of the less transmissive sectors 29 and the maximum intensity transmitted is at the centers of the more transmissive sectors 27. For an ideal starburst target 23, the intensity modulation of the light by the target would be perfectly sinusoidal and the curve of FIG. 3 would be the ideal sinewave. However, FIG. 3 illustrates the more general case in which the light intensity modulation, although sinusoidal in nature, is not the ideal sinewave due to the variation in light transmission of the sectors 29 and differences in light transmission of the sectors 27. The intensity variation of the light as shown generally in FIG. 3 can be stored by the image processing apparatus 21. With this arrangement, for a high quality test lens the spatial frequency of the target 23 along any ring-shaped region of the target generally coaxial with the target is substantially the same throughout such ring-shaped region. In addition, the spatial frequency of the target decreases progressively in a radial outward direction. For example, the spatial frequency of the target along a ring-shaped region 31 of relatively large diameter is less than the spatial frequency along a ring-shaped region 33 of smaller diameter.

Targets having sinusoidally varying light intensity transmission properties are known per se, and the target 23 can be constructed in accordance with known techniques. For example, the target 23 may be constructed using a chromic vacuum deposition photoresist process on a high quality crown glass substrate.

With the target 23 positioned to receive light from the light source 15, light passes through the target to the test lens 13 and the test lens forms a target image 35 (FIG. 4A) of the target at the focal plane of the test lens. The target image 35 has generally radially extending and alternating relatively high light intensity or light sectors 27a and relatively low light intensity or dark sectors 29a. The sectors 27a and 29a correspond to the sectors 27 and 29, respectively, of the target 23. In the form shown in FIG. 2A, the sectors 27 and 29 terminate radially outwardly in a circular periphery 36, and the target 23 is opaque radially outwardly of the periphery 36. An ideal test lens 13 would produce an ideal target image 35 which would perfectly represent the target 23. However, imperfections in the test lens 13 will distort the target image 35 in a variety of ways. Consequently, the target image 35 contains information as to the nature and degree of the imperfections.

Figure 4A:
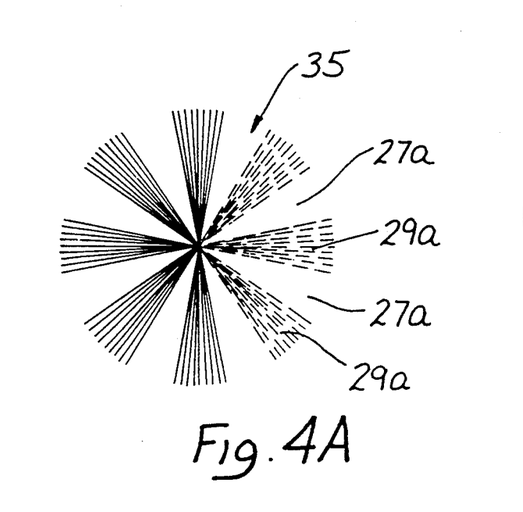
FIGS. 4A and 4B are target images provided by the targets of FIGS. 2A and 2B, respectively.

The sinusoidal intensity modulation provided by the target 23 assures that the light intensity of the target image 35 provided by the target 23 will vary generally in sine wave fashion along any ring-shaped region which is coaxial with the target image. In other words, the variation of lightness and darkness or gray shades of the target image 35 is sinusoidal and substantially in accordance with FIG. 3. Consequently, for an ideal test lens 13 the spatial frequency of the target image 35 along any generally circular ring-shaped region of that image generally coaxial with the image is substantially the same throughout such circular ring-shaped region. Even for a non-ideal test lens 13, the spatial frequency of the target image 35 is substantially the same along selected circumferentially extending bands or regions.

An in focus or best focus target image 35 is recorded by the camera 19 and transmitted to the image processing apparatus 21 for processing. The target 23 is the only target is that required for the MTF calculations in that the image processing apparatus 21 can make MTF calculations based solely on the target image 35. This can be accomplished by electronically scaling the ring-shaped regions of the target image 35 along which contrast measurements are to be made. However, as discussed above, the electronic scaling of the ring-shaped regions without the benefit of some kind of ring target is ordinarily unsatisfactory because of the presence of one or more of the following factors: testing of the lens at more than just the best focus condition, insufficient quality of the test lens and/or inaccurate positioning of the test lens. To deal with factors such as these, the bullseye target 25 (FIG. 2B) is used. The target 25 is opaque except for an annular region 37 which is transparent to light from the light source 15. The annular region 37 has an inner periphery 39, an outer periphery 41 and has a diameter less than the radius of the sectors 27 and 29 of the target 23. The target 25 may be constructed in the same manner as the target 23.

After the target 23 has been used to provide the target image 35, the target 23 is taken out of the light path from the light source 15, and the target 25 is inserted in that light path in a position to receive light from the light source. The test lens 13 forms a target image 43 (FIG. 4B) of the target 25 and the camera 19 records the target image 43.

Figure 4B:
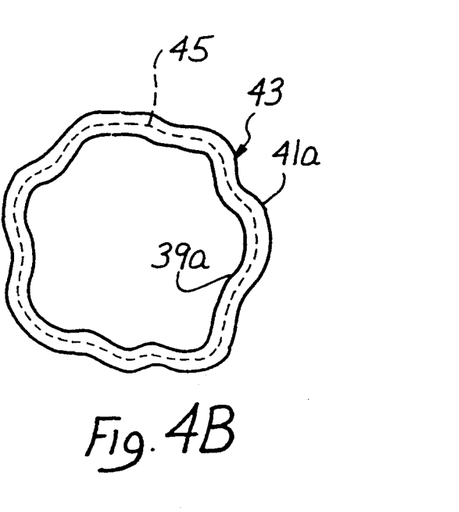

Because of the usual presence of one or more of the three factors noted above, the target image 43 is not circular. Rather, the target image 43 defines a circumferentially extending region which, in the form shown in FIG. 4B, is generally ring-shaped and continuous. The deviations from a circular configuration in the target image 43 are somewhat exaggerated in FIG. 4B, and FIG. 4B represents a general shape of the target image 43 for a test lens having complex surface imperfections.

The two target images 35 and 43 are all that the image processing apparatus 21 requires in order to determine MTF. However, for depth of focus considerations, it is desirable to obtain and record at least three of the target images 35, with one of the target images 35 being the best or in focus image and with the other two being in the image space of the test lens 13 but slightly out of focus on opposite sides of the focal plane. Similarly, for depth of focus considerations, at least three of the target images 43 are obtained and recorded for corresponding focus conditions. Thus, when considering depth of focus the image processing apparatus 21 preferably has at least three of the target images 35 and at least three corresponding target images 43. Because out of focus images are used for depth of focus inspection of the test lens 13, the use of the target 25 is particularly important.

Figure 6:
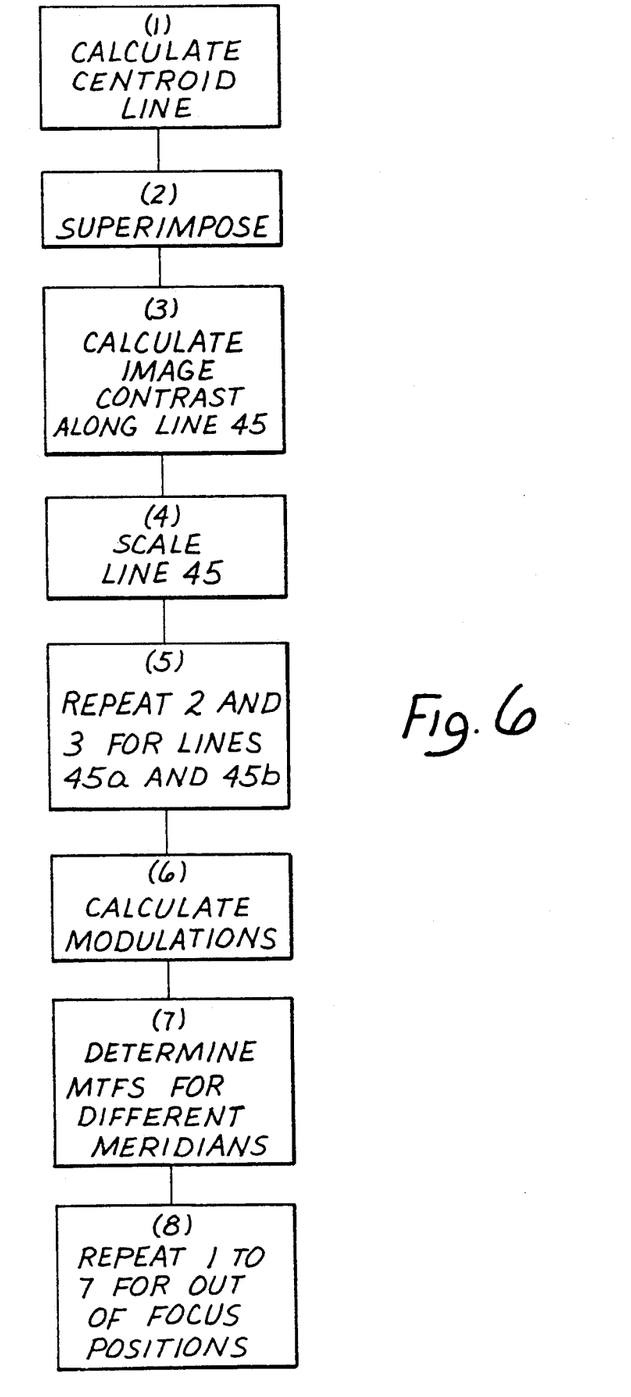
FIG. 6 is a flow chart showing a portion of the processing of the information derived from the target images.

The image processing apparatus 21 processes the information from the target images 35 and 43, and this may be carried out using software, electronic hardware or any combination of the two. FIG. 6 is a f low chart illustrating the steps carried out by the image processing apparatus in order to calculate MTF.

As shown in FIG. 6, the image processing apparatus 21 first calculates a centroid line or band 45 (FIG. 4B) of the target image 43. The target image 43 has peripheries 39a and 41a corresponding to the peripheries 39 and 41, respectively, of the target 25 and the centroid line 45 lies half way between the peripheries 39a and 41a and is parallel to these peripheries. In calculating the centroid line 45, the actual shape of the target image 43 could be utilized by the processing equipment described below. For a less general case in which it is assumed that the test lens 13 is subject only to astigmatic conditions, it may be assumed that the target image 43 will be in a slightly elliptical form. In this event, the computer described below in connection with FIG. 10 may be programmed to force fit the detected shape of the target image 43 into an elliptical configuration. Of course, it may be assumed that the target image 43 is in a shape other than elliptical.

Figure 5A:
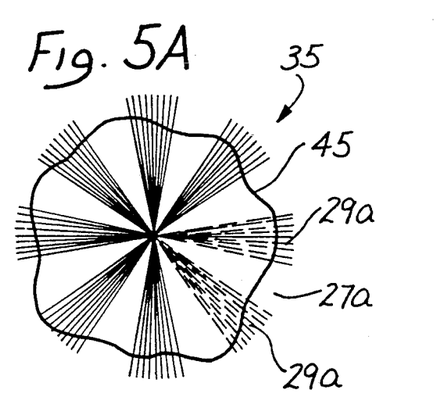
FIGS. 5A, 5B and 5C show the target image of FIG. 4A with centroid lines of different radial dimensions superimposed on the target image.

Next as shown in FIG. 6, the image processing apparatus 21 coaxially superimposes the centroid line 45 on the target image 35 (FIG. 5A). The centroid line 45, which extends circumferentially and is generally ring-shaped, corresponds to a particular spatial frequency of the target 35 and defines a circumferentially extending region along which spatial frequency of the target 35 is substantially the same. Thus, the configuration of the target image 43 provided by the bullseye target 25 is usable to create this substantially constant spatial frequency condition.

Contrast of the target image 35 is then determined along the line 45 (FIG. 6), and this information is used as described below to determine MTF. More specifically image contrast is calculated by the apparatus 21 for each adjacent pair of the sectors 27a and 29a. In the embodiment illustrated, there are eight sector pairs, but this is merely illustrative. Image contrast is determined from the following equation $$C_i = \frac{I_1 - I_2}{I_1 + I_2} \quad \text{Equation 1}$$

where $C_1$ is image contrast for a sector pair, $I_1$ is a quantitative measure of the lightest part of the sector pair along the line 45, and $I_2$ is a similar quantitative measure of the darkest region of the sector pair along the line 45. These contrast calculations for each sector pair can be made very rapidly and the angle of each sector pair noted.

Figure 5B:
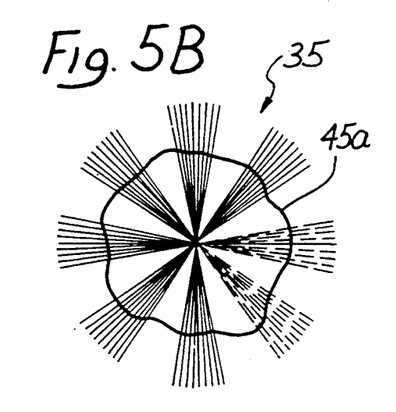
Figures 5C, 7:
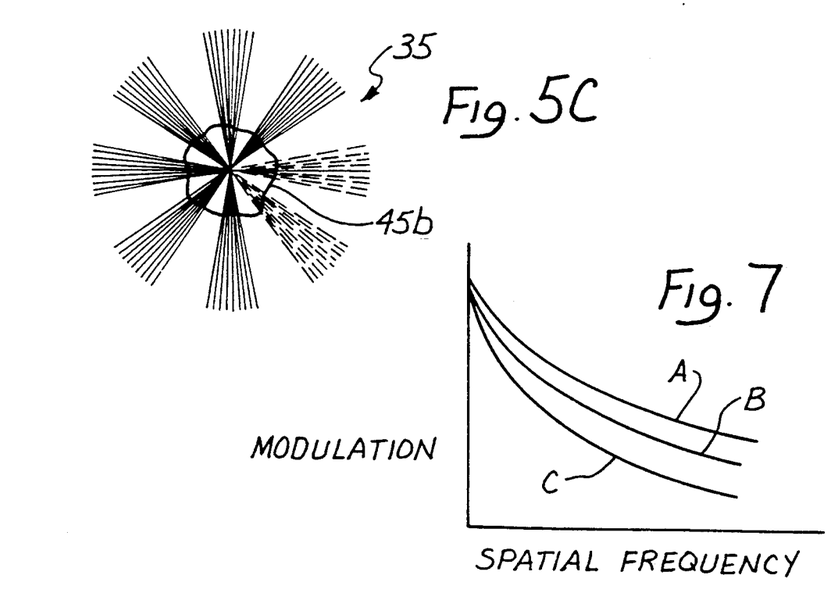
FIG. 7 is a plot of modulation versus spatial frequency for several different sector pairs.

Because the spatial frequency is a function of the radial distance from the center of the target image 35, the centroid line 45 can be scaled up or down as necessary (FIG. 6) to provide for contrast determinations at different spatial frequencies. For example, the centroid line 45 can be scaled down electronically by the apparatus 21 to form the line 45a (FIG. 5B), and scaled down further to provide the line 45b (FIG. 5C) to provide for contrast measurements at higher spatial frequencies. In these three examples, the spatial frequencies run from relatively low (FIG. 5A) to an intermediate frequency (FIG. 5B) to a relatively high spatial frequency (FIG. 5c).

The spatial frequencies provided by the lines 45, 45a and 45b can be selected to cover the range desired. The decision as to which spatial frequencies to use is preferably based upon the application requirements for the test lens 13. For example, for an IOL, the lowest spatial frequency (FIG. 5A) may be 8.6 cycles/degree (c/degree) which corresponds to 20/70 visual acuity and is a minimum legal requirement for driving. The highest spatial frequency (FIG. 5C) may be, for example, 60 c/degree which corresponds to a visual acuity of 20/10 and is considered as the limit of resolution of human vision. An intermediate spatial frequency (FIG. 5B) of, for example, 12 c/degree may also be employed. Of course, other intermediate spatial frequencies as well as higher and lower spatial frequencies can be utilized, if desired. With the centroid line 45 scaled, the centroid lines 45a and 45b are coaxially superimposed on the target image 35 (FIGS. 5B and 5C) and image contrast calculations are repeated (FIG. 6) for each sector pair along the lines 45a and 45b.

Next as shown in FIG. 6, a modulation is calculated for each of the image contrasts using the following equation $$M = \frac{C_i}{C_t} \quad \text{Equation 2}$$

where M is modulation, $C_i$ is image contrast for a sector pair and $C_t$ is target contrast for the corresponding sector pair of the target. The target contrast is known from measurements of the target, and this information can be stored in the image processing apparatus 21. Thus, implementing Equation 2 provides a modulation for different meridians, i.e. for each sector pair of the target image 35 for each of the spatial frequencies being used.

MTF, which is the relationship between spatial frequency and modulation, is then determined for different meridians (FIG. 6). From this information a plot of modulation versus spatial frequency for different meridians, i.e. for each of the sector pairs can be determined and plotted as shown by way of example in FIG. 7. For example, the curve A in FIG. 7 may be a plot of the calculated modulations at the spatial frequencies defined by the lines 45, 45a and 45b (FIG. 5A–5C) for any selected sector pair 27a and 27b. For simplicity, FIG. 7 illustrates only three curves A, B and C for three of the sector pairs, respectively. The curves A, B and C are hypothetical and do not represent any actual data, but they do illustrate that the MTF for each of the angles or sector pairs represented by these three curves can differ. Of course, eight curves could be plotted in FIG. 7 to correspond with the eight sector pairs of FIGS. 5A, 5B and 5C, if desired.

In order to inspect the test lens 13 for depth of focus, the target images 35 and 43 are also obtained for out of focus positions. Steps 1 to 7 of FIG. 6 are then repeated for each out of focus position. Consequently, curves of the type shown in FIG. 7 can be obtained and MTF's are calculated for each in focus and out of focus position.

Next, the image processing apparatus 21 processes the modulation and MTF information obtained from the target images 35 and 43 according to any desired program for the purpose of making a decision as to whether or not the test lens 13 passes the inspection or should be rejected. The particular program used for this purpose will depend on various factors such as the desired quality level for the test lens 13, the applications to which the test lens is to be put, etc.

Figure 8:
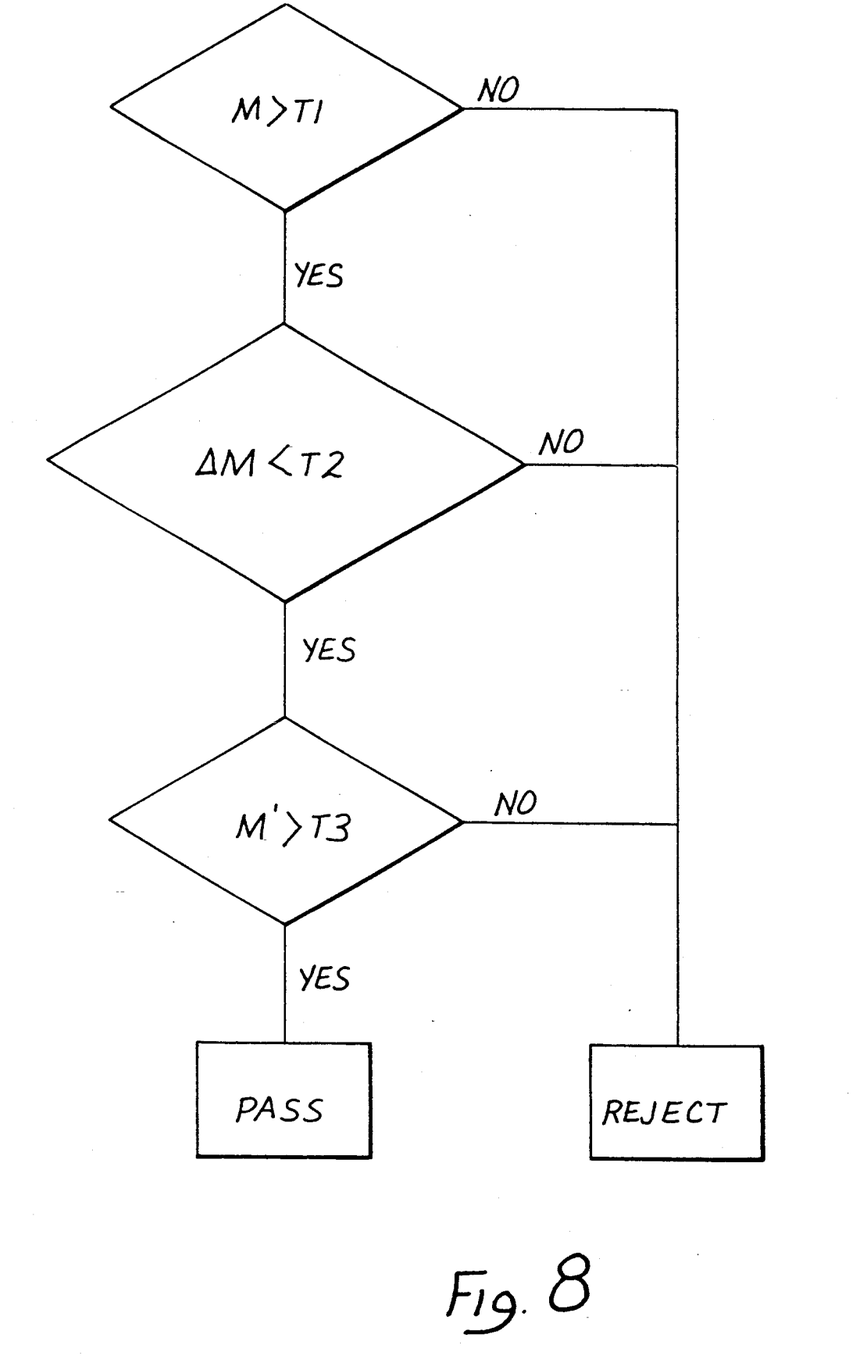
FIG. 8 is a flow chart showing one program for determining if a test lens is acceptable.

FIG. 8, which can be considered as an extension of FIG. 6, provides one example of how the data obtained in the steps of FIG. 6 can be processed to make pass-fail determinations for the test lens 13; i.e. determining whether the test lens 13 is of suitable optical quality. The program illustrated in FIG. 8 is particularly adapted for use with an IOL, however, its use is not so limited and various other programs can be employed for testing of IOL's and/or other test lenses 13.

In the program of FIG. 8, the first step is to determine whether or not all of the best focus modulations M calculated utilizing Equation 2 are above a threshold T. Thus, for the test lens 13 to pass this stage of the inspection, each modulation for each sector pair at the best focus position must be greater than the threshold T. If any of these modulations is less than T, the test lens 13 is rejected. A primary purpose for this step of the program is to determine the focus performance of the test lens 13.

The next step of the program tests for image symmetry. In the program of FIG. 8, this is accomplished by comparing the difference between best focus modulations M to a threshold T2 and rejecting the test lens if $\Delta M$ is greater than T2. More specifically, this step of the program includes comparing all of the best focus modulations at the spatial frequency defined by the centroid line 45 (FIG. 5A) to determine whether or not the difference between any two of these modulations ($\Delta M$) is greater than T2. If it is not, then all of the modulations at the spatial frequency determined by the centroid line 45A (FIG. 5B) are compared to see if the difference between any two of them is greater than T2. If not, then all of the modulations at the spatial frequency defined by the centroid line 45b (FIG. 5C) are compared to see if the difference between any two of them is greater than T2.

The final step of the program illustrated in FIG. 8 inspects the test lens 13 for depth of focus considerations. In the final step, the out of focus modulations M' are compared to the threshold T3. In order to pass this phase of the program, all of the out of focus modulations M' for at least one spatial frequency in each of the out of focus positions must be greater than a threshold T3. For example, in the case of employing the three spatial frequencies of FIGS. 5A–C and two different out of focus positions, the test lens would pass if all of the modulations at any of the spatial frequencies defined by the centroid lines 45, 45a or 45b were to be greater than T3 in all out of focus positions. It is not necessary that the modulations meeting this requirement at one out of focus position be at the same spatial frequency as the modulations meeting this requirement at the other out of focus position or positions of the test lens.

The functions described in connection with the flow charts of FIGS. 6 and 8 can be implemented with software in various different ways. The microfiche appendix discloses by way of example a program for carrying out the functions of the flow charts of FIGS. 6 and 8. The program disclosed in the microfiche appendix includes a partial listing of a source code. The software, for which the source code is not fully set forth in the microfiche appendix, is identified in the microfiche appendix and is proprietary to Big Sky Software Corporation of Bozeman, Mont. The proprietary software is available from Big Sky Software Corporation in the form of a disc, tape or the like.

Figure 9:
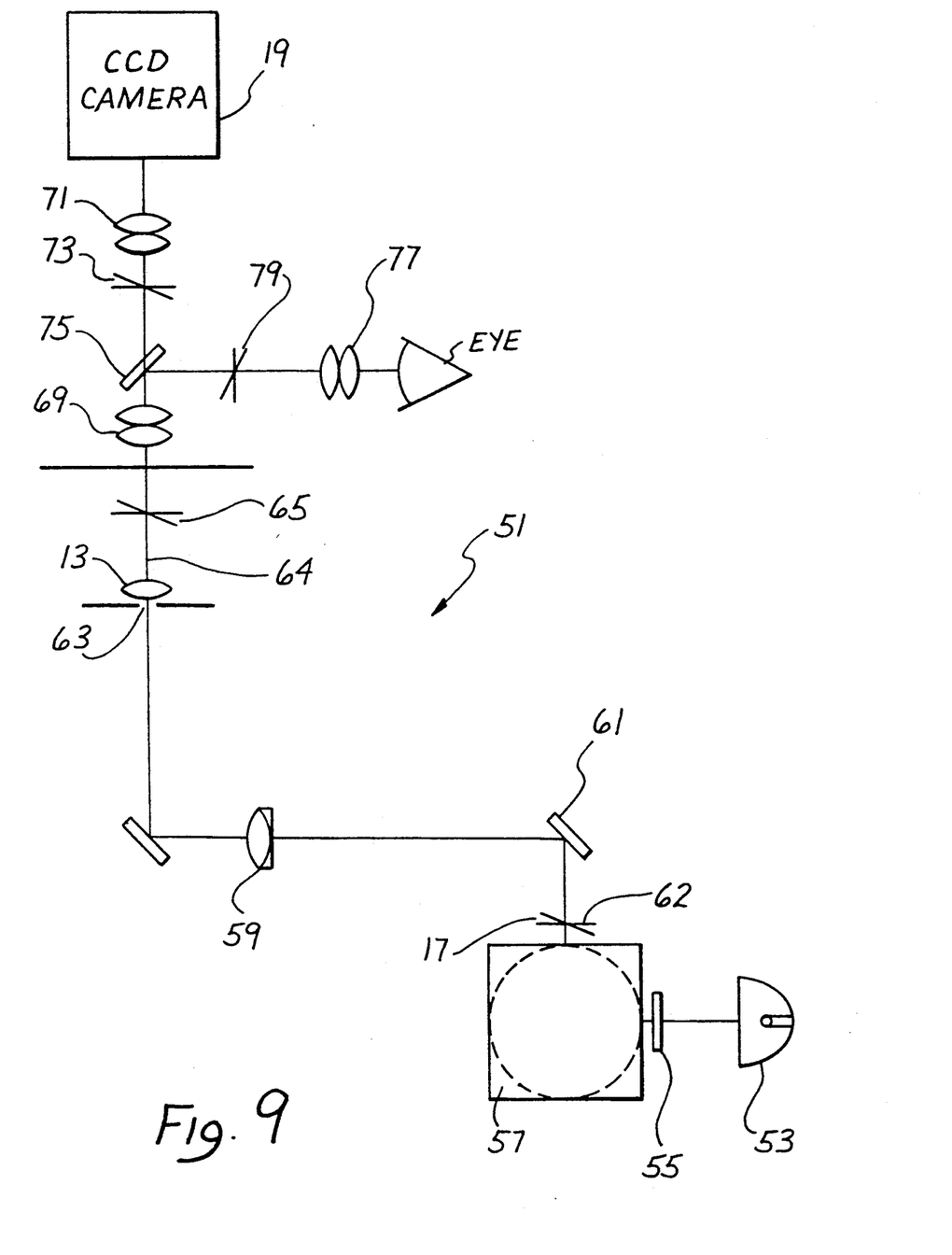
FIG. 9 is a schematic illustration of a focal collimator system usable with this invention.

FIG. 9 shows a focal collimator system 51 which can be used to advantage in implementing this invention. Except for the use of the targets 23 and 25 and the manner in which the target images 35 and 43 are manipulated and processed, the focal collimator system 51 of FIG. 9 may be conventional. Focal collimator systems are discussed, for example, in W. Smith, Modern optical Engineering, McGraw-Hill, New York, 1966.

The system 51 includes a light source or lamp 53 for emitting a beam of light which passes through a filter 55 to an integrating sphere 57. The filter 55 may be a monochromatic filter, such as a green narrow band filter, or a broad band filter. The integrating sphere 57 provides uniform illumination for the targets 17. The targets 17 may comprise any number of targets for conducting various different tests of the test lens. For present purposes, only the targets 23 and 25 are considered, although other targets may be employed as desired. The targets 17 may be located on a conventional rotary disk so that they can be accurately and sequentially positioned to receive illumination from the integrating sphere 57.

The system 51 also includes a collimating lens 59 and a folding mirrors 61 and 62. The collimating lens 59 has an object focal plane 62 and the targets 17 are located at the object focal plane of the collimating lens 59. For example, the collimating lens 59 may be a high quality achromat with an effective focal length of 350 millimeters.

The collimating lens 59 provides a collimated beam of light through an aperture 63 to the test lens 13. The test lens 13 may be held in a suitable conventional lens holding apparatus or target wheel with the test lens coaxial with an optical axis 64. The test lens 63 has an image focal plane 65 at which an image of the selected target 17 is formed. The image formed at the focal plane 65 is relayed to the CCD camera 19, which may be conventional, by a microscope objective 69 and a projection lens 71 of the camera 19. The microscope objective 69 has an image plane 73 at which an image of the selected target is formed for the projection lens 71 of the camera 19. A beam splitter 75 directs some of the illumination from the microscope objective 69 toward an eyepiece 77 of the microscope to permit viewing of the image of the selected target at an image plane 79 of the microscope objective between the beam splitter and the eyepiece.

The focal collimator system 51 of FIG. 9 is used by sequentially positioning of the targets 23 and 25 to receive illumination from the integrating sphere 57. This provides the target images 35 and 43 at the focal plane 65 of the test lens 13 where these images can be viewed through the eyepiece 77 and recorded by the CCD camera 19. The system 51 may be used first to view and record the target images 35 and 43 in the best or in-focus condition. In order to obtain depth of focus information about the test lens 13, the camera 19 and the microscope, including the projection lens 71 and the microscope objective 69 are moved to slightly out-of-focus positions to view the target image in the image space of the test lens first on one side and then the other side of the focal plane 65 of test lens 13. In these positions, the targets 23 and 25 are used as described above in connection with FIG. 6 to provide additional target images 35 and 43 for these out-of-focus positions.

The focal collimator system 51 has the advantage of maintaining the same angular relationship between the features of the selected targets 17 and the associated image. Specifically, the same angular relationship is maintained between, for example, the target 23 and the target image 35. Consequently, the circumferential angular size of the sector pairs 27 and 29 of the target 23 is the same as the circumferential angular size of the corresponding sectors pairs 27a and 29a (FIG. 4A) of the target image 35. Accordingly, the system 51 permits the centroid lines 45, 45a and 45b (FIG. 5A–5C) to define particular angular spatial frequencies by simply knowing the radial dimension of the centroid line. As a result, spatial frequency is directly measured in angular terms (cycle/degree) which is particularly convenient for ophthalmic optics.

Figure 10:
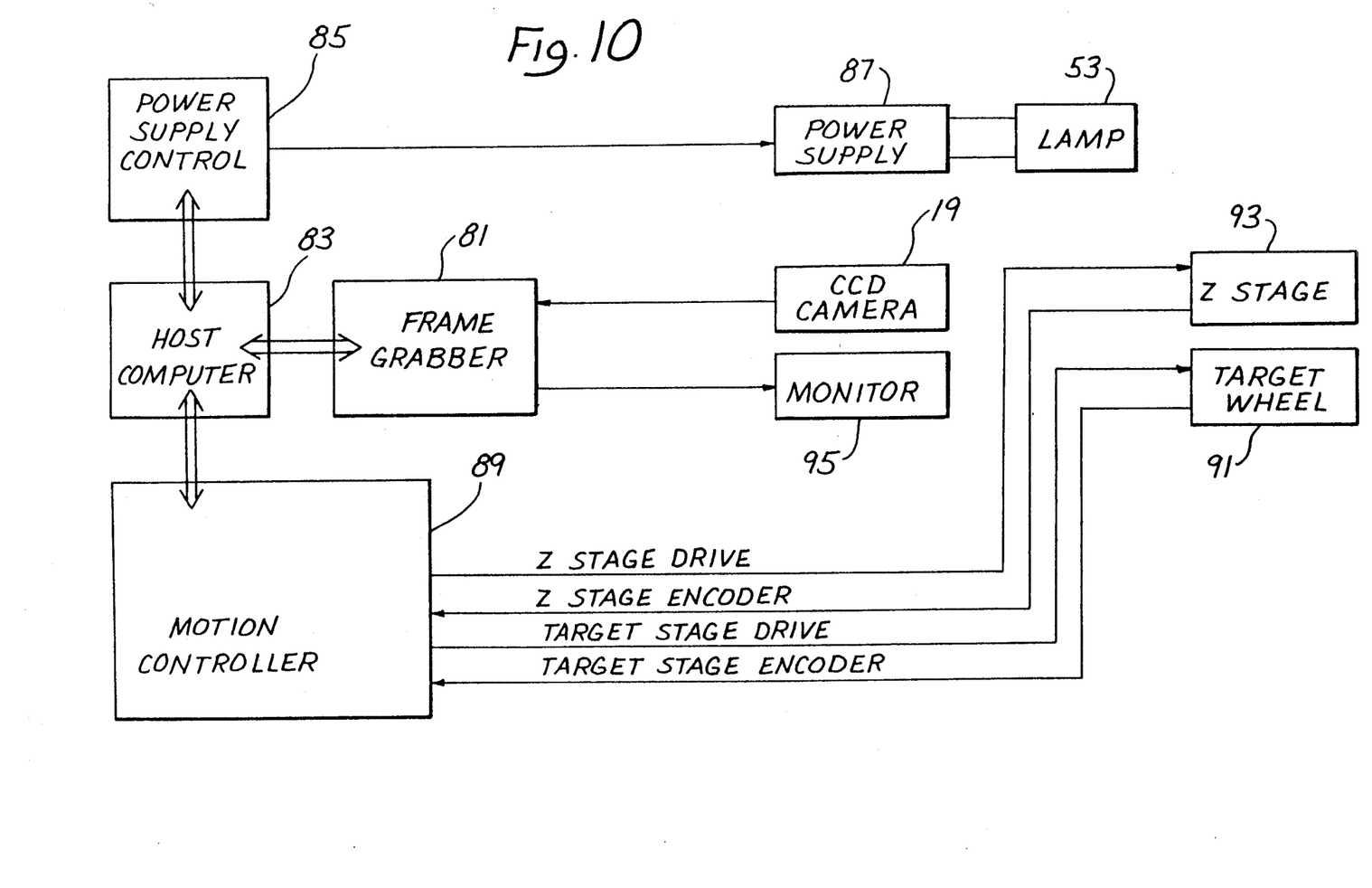
FIG. 10 is a schematic block diagram showing a preferred way of carrying out the image processing of this invention and related functions.

FIG. 10 shows schematically one way to operate the focal collimator system 51 of FIG. 9 in a way to carry out the functions illustrated in FIGS. 6 and 8. From FIG. 10 it can be seen that the CCD camera 19 converts the target images to electronic video signals and provides this video signal to a conventional frame grabber 81. The frame grabber 81 captures the image and transmits an electronic signal representing the image to a host computer 83. This signal provides the computer 83 with the necessary information with respect to intensity of the target images 35 and 43 so that the computer has a complete "picture" of the images in it memory. All of the necessary contrast information regarding the target 23 is stored in the computer 83.

The computer 83, which may be, for example, a personal computer with good calculation capability is programed to carry out the functions and calculations identified in FIGS. 6 and 8, and this can be accomplished by one skilled in this art. For purposes of calculating the centroid line 45 and scaling the centroid lines 45a and 45b (FIG. 5A–5C), the computer may be programmed to assume that the target image 43 is in the form of an ellipse to compensate for optical imperfections in the test lens 13. Alternatively, as discussed above, the computer 83 may be programmed to assume that the target image 43 is of some shape other than an ellipse or may simply calculate the actual shape of the target image 43.

The computer 83 also provides signals to a power supply control 85 which controls a power supply 87 for the lamp 53. In addition, the computer 83 also provides signals to a motion controller 89 which in turn controls a target wheel 91 and a Z stage 93. The target wheel 91, which carries the targets 23 and 25, is positioned at the object focal plane 62 of the collimator lens 59 (FIG. 9) and rotates, upon a command from the computer 83, the appropriate target 17 into position to receive illumination from the integrating sphere 57. The target wheel 91 provides position feedback to the motion controller 89 relative to target movement. The Z stage 93 positions the CCD camera 19 and the microscope to obtain in focus and out of focus target images. The Z stage 93 also provides position feedback to the motion controller 89. The frame grabber 81 also provides a video signal to a camera monitor 95 so that the selected frames can be visually observed.

Figure 11:
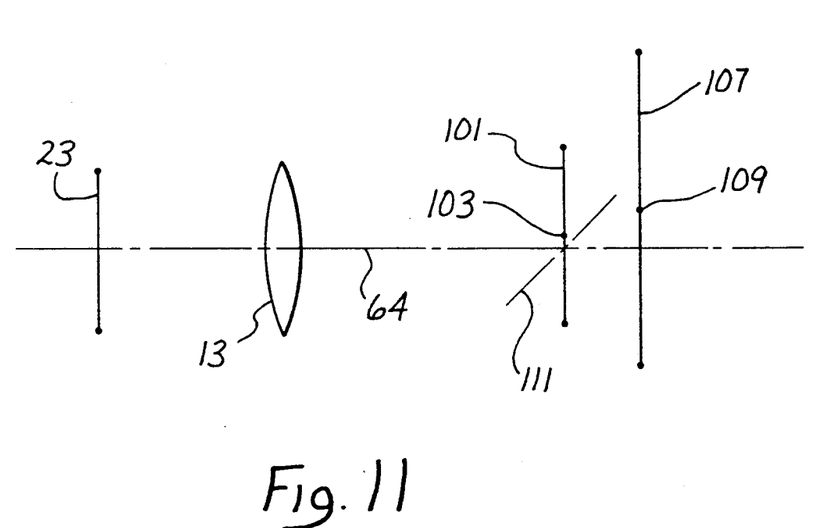
FIG. 11 is a schematic illustration showing how tilting of the test lens displaces the center of the images from the optical axis.

FIG. 11 illustrates schematically how a test lens 13 which is tilted with respect to the optical axis 64 by an imperfect target wheel 91 (FIG. 10) creates distortion of the image. Thus, the test lens 13 forms a best focus image 101 of the target 23, and in the plane of FIG. 11, the best focus image 101 has a center 103 which is displaced slightly above the optical axis 64 as a result of the tilt of the test lens 13.

In an out of focus position, the test lens 13 forms an out of focus image 107 of the target 23, and the center 109 of the out of focus image is displaced radially above the optical axis 64 and from the center 103. Because the images 101 and 107 are recorded by the camera 19 and signals representing these images are transmitted to the computer 83 (FIG. 10), this shifting of the centers 103 and 109 of f of the optical axis 64 can be detected by the computer 83. In addition, the direction established by a radial line between a projection of these centers onto a radial plane determines the image shift meridian along which the images 101 and 107 are shifted off the axis 64. In the example shown in FIG. 11, the image shift meridian is vertical and perpendicular to the optical axis 64.

The image shift meridian identifies the locations at which the light intensity information is least accurate due to the tilting of the test lens 13. On the other hand, the light intensity information is most accurate along a meridian 111 which is perpendicular to the image shift meridian and the optical axis 64. Consequently, the results are improved to the extent that light intensity information at or adjacent the image shift meridian is discarded and the light intensity information at or adjacent the meridian ill is utilized. For best results, light intensity information for the sector pair 27a and 29a closest to the meridian ill is utilized. In any event, the selected light intensity information is used to calculate contrast of the target image in accordance with Equation 1 and modulation in accordance with Equation 2 whereas the discarded light intensity information is not used in these equations.

Of course, the specific sector pairs 27a and 29a for which light intensity information is utilized and the specific sector pairs for which the light intensity information is discarded can be selected in accordance with any desired program. However, regardless of how the specific program is carried out, this feature of this invention provides for the elimination of lens inspection information which is due to incorrect positioning of the test lens 13.

Another optional, but advantageous and related feature of the invention, is that suitable contrast and MTF calculations can be made even though substantial light intensity information is discarded. This can be accomplished, for example, by determining the optical quality characteristic of interest for only the sector pair at or closest to the meridian 111. Thereafter, the test lens 13 is randomly repositioned in the target wheel 91, the best focus and out of focus images 101 and 107 are captured and the process described above is repeated. Again, only light intensity information for the sector pair at or closest to the meridian 111 is used in Equations 1 and 2. However, because the test lens 13 has been repositioned, the meridian 111 has a new random orientation. By repeating this process several times, an adequate inspection of the test lest 13 can be carried out utilizing an otherwise unacceptable target wheel 91.

Although exemplary embodiments of the invention have been shown and described, many changes, modifications and substitutions may be made by one having ordinary skill in the art without necessarily departing from the spirit and scope of this invention.

We claim:

1. An apparatus for inspecting a test lens comprising:
a light source;
a first target positionable to receive light from the light source;
means for directing light from the target to the test lens with an image of the target being formed;
said target providing a particular image which has generally radially extending and alternating first and second sectors, each of the first sectors being relatively light and each of the second sectors being relatively dark; and
means responsive to image contrast along a generally circumferentially extending region of said particular image for determining an optical quality characteristic of the test lens.

2. An apparatus as defined in claim 1 wherein the circumferentially extending region is generally elliptical.

3. An apparatus as defined in claim 1 wherein the means for determining includes means responsive to image contrast along a plurality of radially spaced generally circumferentially extending regions of the image of the target for determining the optical quality characteristic.

4. An apparatus as defined in claim 1 including a ring target positionable to receive light from the light source and usable for providing the generally circumferentially extending region and said generally circumferentially extending region is a generally ring-shaped region of the image.

5. An apparatus as defined in claim 4 wherein said means for determining is also responsive to target contrast along a corresponding generally ring-shaped region of the target.

6. An apparatus as defined in claim 1 wherein the darkness of the particular image provided by said target varies generally in sine wave fashion along said circumferentially extending region of the particular image.

7. An apparatus as defined in claim 1 wherein said determining means includes first means for determining the meridian of any displacement of the image off an optical axis and second means for determining the optical quality characteristic without using light intensity information for the first and second sectors nearest said meridian.

8. An apparatus as defined in claim 7 wherein said means for determining an optical quality characteristic includes means for using light intensity information for the first and second sectors nearest a meridian which is generally transverse to the first mentioned meridian.

9. An apparatus for inspecting a test lens comprising:
a light source;
a first target positionable to receive light from the light source and having generally radially extending and alternating first and second sectors, each of the first sectors being relatively light transmitting to the light from the light source and each of the second sectors being less transmissive to the light from the source;
means for directing light from the target to the test lens with an image of the target being formed; and
means responsive to image contrast along a generally circumferentially extending region of the image of the target for determining an optical quality characteristic of the test lens.

10. An apparatus as defined in claim 9 wherein the circumferentially extending region is generally elliptical.

11. An apparatus as defined in claim 9 wherein the circumferentially extending region is a generally ring-shaped region and the means for determining includes means responsive to image contrast along a plurality of radially spaced generally ring-shaped regions of the image of the target for determining the optical quality characteristic.

12. An apparatus as defined in claim 11 wherein the transmissivity of the first and second sectors of the target to light from the light source is such that for a high quality test lens the spatial frequency of the target along any generally ring-shaped region of the target generally coaxial with the target is substantially the same throughout such ring-shaped region.

13. An apparatus as defined in claim 9 wherein the transmissivity of the first and second sectors of the target to light from the light source is such that for a high quality test lens the spatial frequency of the target along any generally circumferentially extending region of the target generally coaxial with the target is substantially the same throughout such circumferentially extending region.

14. An apparatus as defined in claim 9 including a second target positionable to receive light from the light source and having a generally circumferentially extending region which is transmissive to light from the source so that light from the second target can be directed to the test lens with a circumferentially extending image of the second target being formed and the means for determining includes means for processing the images of the first and second targets to determine the optical quality characteristic of the test lens.

15. An apparatus as defined in claim 14 wherein the processing means includes means for deriving first target information from the image of the first target and second target information from the image of the second target and means for superimposing the first and second target informations so that image contrast along the generally circumferentially extending region of the image of the first target can be ascertained.

16. An apparatus as defined in claim 15 wherein the second target information includes a centroid band of the circumferentially extending image of the second target and the centroid band defines the generally circumferentially extending region of the image of the first target.

17. An apparatus as defined in claim 16 wherein processing means includes means for determining another centroid band of a different radial dimension from the first mentioned centroid band so image contrast along another circumferentially extending region of the image of the first target can be ascertained.

18. An apparatus as defined in claim 17 wherein said means for determining is also responsive to target contrast along corresponding generally circumferentially extending regions of the first target.

19. An apparatus as defined in claim 9 wherein the transmissibility of the first target to light from the light source varies generally in sine wave fashion along said circumferentially extending region of the image.

20. An apparatus for inspecting a test lens comprising:
a light source;
means for holding the test lens, the test lens having an image focal space;
a collimating lens positioned to receive light from the light source and direct collimated light to the test lens, said collimating lens having an object focal plane;
a plurality of targets positionable substantially at the object focal plane of the collimating lens whereby there is an image of the target positioned at the object focal plane of the collimating lens at the image focal space of the test lens;
at least one of said targets providing a particular image at the image focal space of the test lens which has generally radially extending and alternating first and second sectors, each of the first sectors being relatively light and each of the second sectors being relatively dark; and
means responsive to image contrast along a generally ring-shaped region of said particular image for determining an optical quality characteristic of the test lens.

21. An apparatus as defined in claim 20 wherein the means for determining includes means responsive to image contrast along a plurality of generally ring-shaped regions of said particular image for determining the optical quality characteristic, said ring-shaped regions and said particular image being generally coaxial.

22. An apparatus as defined in claim 21 wherein for a test lens of high quality the spatial frequency of said particular image along any of said ring-shaped regions is the same throughout such ring-shaped region and is different from one ring-shaped region to another.

23. An apparatus as defined in claim 20 wherein light from the light source is transmitted through said one target to provide the image of said one target and the transmissivity of said one target to light from said light source continuously varies in a circumferential direction.

24. An apparatus as defined in claim 20 wherein a second of the targets provides a generally ring-shaped image and said means for determining includes means responsive to the generally ring-shaped image for providing said generally ring-shaped region of said particular image.

25. An apparatus as defined in claim 20 wherein the light source includes means for providing a substantially uniform light flux.

26. An apparatus for inspecting a test lens comprising:
a light source;
a first target positionable to receive light from the light source;
means for directing light from the target to the test lens with an image of the target being formed;
said target providing a particular image in which the spatial frequency of the image along any generally ring-shaped region of the image generally coaxial with the image is substantially the same throughout such ring-shaped region and is different from one ring-shaped region to another; and means responsive to image contrast along a plurality of said ring-shaped regions for determining modulation transfer function of the test lens.

27. A method of inspecting a test lens comprising:
transmitting light from a target to a test lens to provide an image of the target with such image having generally radially extending and alternating first and second sectors and with each of the first sectors being relatively light and each of the second sectors being relatively dark; and determining an optical quality characteristic of the test lens using image contrast along a generally circumferentially extending region of the image.

28. A method as defined in claim 27 wherein the step of determining includes determining an optical quality characteristic of the test lens using image contrast along a plurality of generally circumferentially extending regions of the image.

29. A method as defined in claim 27 including transmitting light from a second target to the test lens to provide a generally ring-shaped image of the second target and the step of determining includes using the generally circumferentially extending image of the second target to determine said generally ring-shaped region of the image.

30. A method as defined in claim 27 wherein said step of determining includes determining whether or not the test lens passes or fails a predetermined optical performance standard.

31. A method as defined in claim 27 wherein said step of determining is carried out using target contrast along a corresponding generally circumferentially extending region of the target.

32. A method as defined in claim 27 wherein the step of determining includes determining the meridian of any displacement between an optical axis and a center of the image and determining the optical quality characteristic without using light intensity information for the first and second sectors nearest said meridian.

33. A method as defined in claim 32 wherein the step of determining the meridian includes identifying the radial position of the image in at least two different focus positions along the optical axis and the step of determining the optical quality characteristic includes using light intensity information for the first and second sectors nearest a meridian which is generally transverse to the first mentioned meridian.

34. A method of making a test lens of suitable optical quality comprising:
providing a test lens;
transmitting light from a target to the test lens to provide an image of the target with such image having generally radially extending and alternating first and second sectors and with each of the first sectors being relatively light and each of the second sectors being relatively dark;
determining an optical quality characteristic of the test lens using image contrast along a generally circumferentially extending region of the image; and
determining whether the test lens is of suitable optical quality using the optical quality characteristic.

35. A method as defined in claim 34 wherein the step of determining includes determining an optical quality characteristic of the test lens using image contrast along a plurality of generally circumferentially extending regions of the image.

36. A method as defined in claim 34 including transmitting light from a second target to the test lens to provide a generally ring-shaped image of the second target and the step of determining includes using the generally circumferentially extending image of the second target to determine said generally ring-shaped region of the image.

* * * * *